United States Patent
Paraskeva et al.

(10) Patent No.: US 12,425,407 B2
(45) Date of Patent: Sep. 23, 2025

(54) IDENTITY AND ACCESS MANAGEMENT USING A DECENTRALIZED GATEWAY COMPUTING SYSTEM

(71) Applicant: The Boeing Company, Chicago, IL (US)

(72) Inventors: Baris F. Paraskeva, Chicago, IL (US); Jack Hsu, Richmond (CA); Yu Sang Chik, Chicago, IL (US); Jimmy Edward, Chicago, IL (US)

(73) Assignee: The Boeing Company, Arlington, VA (US)

( * ) Notice: Subject to any disclaimer, the term of this patent is extended or adjusted under 35 U.S.C. 154(b) by 203 days.

(21) Appl. No.: 17/992,022

(22) Filed: Nov. 22, 2022

(65) Prior Publication Data
US 2024/0171579 A1  May 23, 2024

(51) Int. Cl.
*H04L 9/40* (2022.01)

(52) U.S. Cl.
CPC ........ *H04L 63/101* (2013.01); *H04L 63/0428* (2013.01); *H04L 63/102* (2013.01)

(58) Field of Classification Search
CPC .. H04L 63/101; H04L 63/0428; H04L 63/102
See application file for complete search history.

(56) References Cited

U.S. PATENT DOCUMENTS

| | | | |
|---|---|---|---|
| 11,395,139 B1* | 7/2022 | Paczkowski | H04W 12/12 |
| 2014/0194112 A1* | 7/2014 | Ngo | H04W 4/16 |
| | | | 455/419 |
| 2019/0303600 A1* | 10/2019 | Hamel | H04L 9/3239 |
| 2020/0366484 A1* | 11/2020 | So | H04L 9/3213 |

* cited by examiner

*Primary Examiner* — Jeffrey D. Popham
(74) *Attorney, Agent, or Firm* — Harrity & Harrity, LLP

(57) ABSTRACT

An example method is performed by one or more processors of a gateway computing system. The method includes receiving, from a user computing system, a request to access a software application hosted on a server with which the gateway computing system is in communication. The method also includes in response to receiving the request, communicating with the user computing system to obtain a credential for the software application issued to a user of the user computing system. The method also includes comparing the credential to credential data stored on a distributed ledger to determine whether the credential meets a set of conditions. The method also includes in response to determining that the credential meets the set of conditions, establishing an authorized session between the user computing system and the server such that communication between the user computing system and the server passes through the gateway computing system.

20 Claims, 3 Drawing Sheets

IDENTITY AND ACCESS MANAGEMENT USING A DECENTRALIZED GATEWAY COMPUTING SYSTEM

FIELD

The present disclosure relates generally to identity and access management, and more particularly, to decentralized gateway services.

BACKGROUND

In practice, a particular authority such as a corporation can control user access to information within a computer network using identity and access management systems and corresponding protocols. To facilitate this in some existing networks, a gateway (referred to as a "reverse proxy," in some contexts) sits in front of a server that hosts a software application and proxies all traffic to the server, including access requests from users' client devices.

However, existing gateways such as these typically have minimal or no support for authentication protocols, thus leaving it to the server to handle user authentication (and sometimes authorization as well) when a user is seeking access to the software application. Such existing gateways also typically require a large quantity of custom code in order to make them usable for authentication purposes.

Additionally, an authority often has to issue access privileges not only to information protected by that authority's own identity and access management systems, but to information protected by another authority's identity and access management systems. This can be particularly problematic for authorities, since it requires them to manage user permissions across multiple different systems, which can be inefficient.

What is needed is an alternative identity and access management solution that is more efficient, less costly, easier to implement, and more versatile.

SUMMARY

In an example, a method is described. The method is performed by one or more processors of a gateway computing system. The method includes receiving, from a user computing system, a request to access a software application hosted on a server with which the gateway computing system is in communication. The method also includes in response to receiving the request, communicating with the user computing system to obtain, from the user computing system, a credential for the software application issued to a user of the user computing system. The method also includes comparing the credential to credential data stored on a distributed ledger to determine whether the credential meets a set of conditions. The method also includes in response to determining that the credential meets the set of conditions, establishing an authorized session between the user computing system and the server such that communication between the user computing system and the server passes through the gateway computing system.

In another example, a gateway computing system is described. The gateway computing system includes one or more processors. The gateway computing system also includes a non-transitory computer readable medium having stored thereon instructions, that when executed by the one or more processors, cause the gateway computing system to perform a set of operations. The set of operations includes receiving, from a user computing system, a request to access a software application hosted on a server with which the gateway computing system is in communication. The set of operations also includes in response to receiving the request, communicating with the user computing system to obtain, from the user computing system, a credential for the software application issued to a user of the user computing system. The set of operations also includes comparing the credential to credential data stored on a distributed ledger to determine whether the credential meets a set of conditions. The set of operations also includes in response to determining that the credential meets the set of conditions, establishing an authorized session between the user computing system and the server such that communication between the user computing system and the server passes through the gateway computing system.

In another example, a non-transitory computer readable medium having stored thereon instructions, that when executed by one or more processors of a gateway computing system, cause the gateway computing system to perform a set of operations is described. The set of operations includes receiving, from a user computing system, a request to access a software application hosted on a server with which the gateway computing system is in communication. The set of operations also includes in response to receiving the request, communicating with the user computing system to obtain, from the user computing system, a credential for the software application issued to a user of the user computing system. The set of operations also includes comparing the credential to credential data stored on a distributed ledger to determine whether the credential meets a set of conditions. The set of operations also includes in response to determining that the credential meets the set of conditions, establishing an authorized session between the user computing system and the server such that communication between the user computing system and the server passes through the gateway computing system.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Figure 1:
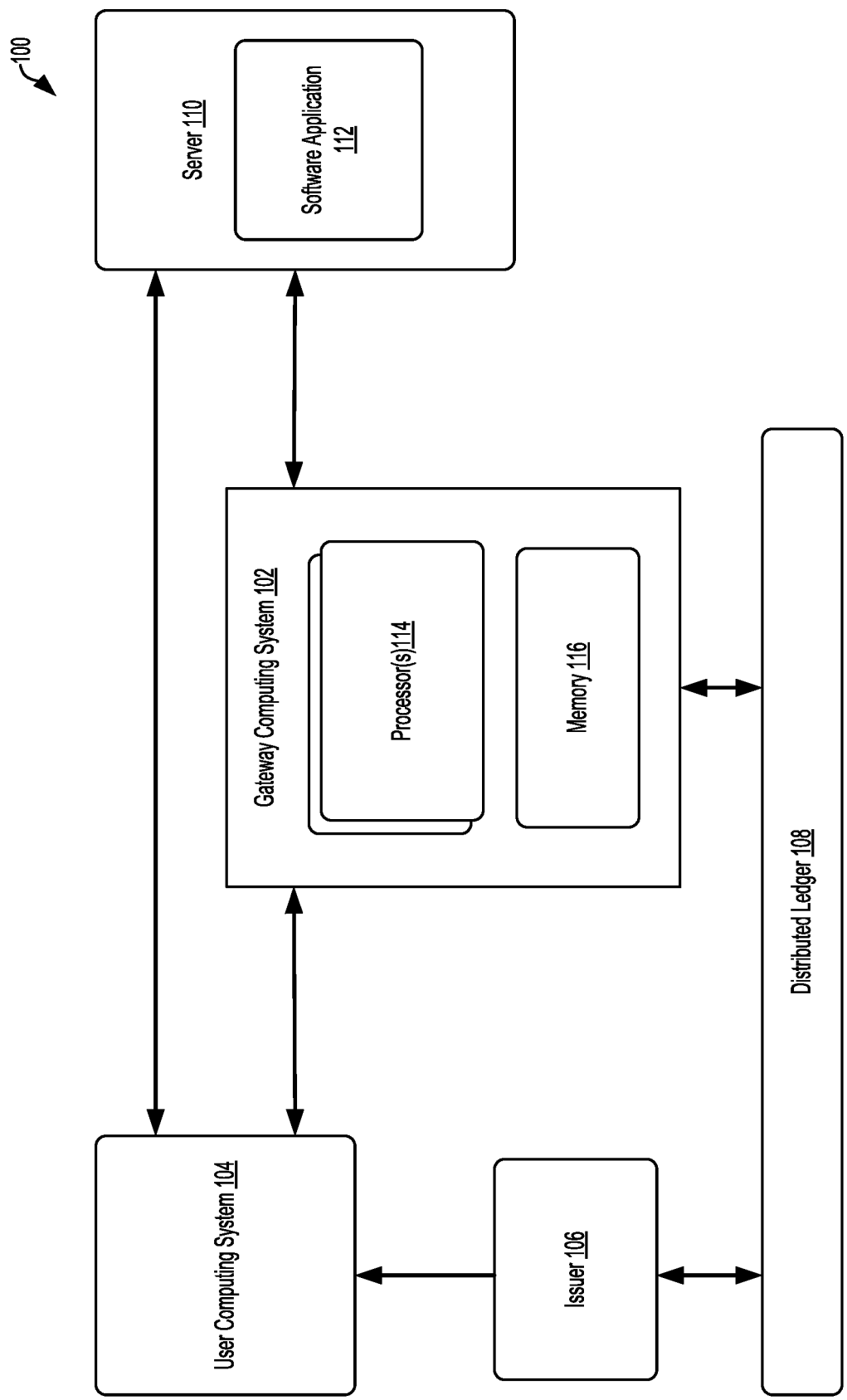
FIG. 1 depicts a system, according to an example implementation.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Unless otherwise specifically noted, elements depicted in the drawings are not necessarily drawn to scale.

Within examples, described herein is a system and corresponding method for identity and access management using a decentralized gateway computing system. The gateway computing system is configured to interact with a distributed ledger in order to validate user credentials and can operate in front of any software application for which access controls are needed.

In accordance with the present disclosure, the gateway computing system receives, from a user computing system, a request to access a software application hosted on a server with which the gateway computing system is in communication. In response to receiving the request, the gateway computing system communicates with the user computing system to obtain, from the user computing system, a credential for the software application issued to a user of the user computing system. The gateway computing system then compares the credential to credential data stored on a distributed ledger to determine whether the credential meets a set of conditions. The distributed ledger does not store the credential itself (or any other personally-identifying information for the user that holds the credential), but rather data that the gateway computing system can use to help validate the credential. The credential can be stored, for example, in a digital wallet controlled only by the user for which the credential has been issued.

In response to determining that the credential meets the set of conditions, the gateway computing system establishes an authorized session between the user computing system and the server such that communication between the user computing system and the server passes through the gateway computing system. Thus, the user that holds the credential can thereafter make authenticated requests for content that the software application provides.

The disclosed gateway computing system acts as a first point of contact for identity and access management processes initiated by a user attempting to access content of a software application, where the gateway computing system is responsible for authenticating users to access that software application.

By using a distributed ledger in which credential data is cryptographically secured and stored, as opposed to being stored at and controlled by a central controlling entity, definitions for credentials that are issued by an authority can be validated by any participant in the computer network in which the disclosed processes are implemented—that is, by any device in the computing network that has access to the distributed ledger. The use of self-sovereign identity credentials in conjunction with a distributed ledger in this way can also help reduce cost in issuing, revoking, maintaining, and verifying credentials.

Further, because the disclosed gateway computing system supports authentication through interaction with the distributed ledger and recognizes self-sovereign identity credentials issued to various user systems, there is no need for support of a diverse range of other identity and access management protocols.

These and other improvements of the disclosed decentralized approach to identity and access management are described in more detail below. Implementations described below are for purposes of example. The implementations described below, as well as other implementations, may provide other improvements as well.

Referring now to the figures, FIG. 1 depicts a system 100, according to an example implementation. The system 100 includes a gateway computing system 102, a user computing system 104, an issuer 106, a distributed ledger 108, and a server 110 that hosts a software application 112. The gateway computing system 102 includes one or more processors 114 and a memory 116.

Further, there are various arrows depicted in FIG. 1 that connect the above-described components of the system 100. Each such arrow represents a wired and/or wireless mechanism that connects and facilitates direct or indirect communication between two or more components, systems, or other entities. Such a mechanism can take the form of a cable, system bus, peer-to-peer encrypted channel, or other type of mechanism. In this way, at least a portion of the depicted components of the system 100 can be communicatively coupled to each other as part of a peer-to-peer network within examples.

The gateway computing system 102 can be or include one or more computing devices, any of which can include a respective processor and any of which can include, or otherwise have access to, memory. As such, the one or more processors 114 and the memory 116 depicted in FIG. 1 include one or more processors and memory of a single computing device or multiple computing devices.

The one or more processors 114 can be or include one or more general-purpose processors and/or one or more special purpose processors (e.g., a digital signal processor, application specific integrated circuit, etc.). The one or more processors 114 is/are configured to execute instructions (e.g., computer-readable program instructions including computer executable code) that are stored in memory 116 and are executable to provide various operations described herein.

The memory 116 that stores the instructions can take the form of one or more computer-readable storage media that can be read or accessed by the one or more processors 114. The computer-readable storage media can include volatile and/or non-volatile storage components, such as optical, magnetic, organic or other memory 116 or disc storage, which can be integrated in whole or in part with the one or more processors 114. The memory 116 is considered non-transitory computer readable media. In some examples, the memory 116 can be implemented using a single physical device (e.g., one optical, magnetic, organic or other memory or disc storage unit), while in other examples, the memory 116 can be implemented using two or more physical devices.

The user computing system 104 can be or include one or more computing devices, any of which can include a respective processor and any of which can include, or otherwise have access to, memory. For example, the user computing system 104 can include one or more smartphones, tablet computers, personal computers, laptop computers, and/or servers.

Further, at least one computing device of the user computing system 104 includes a user agent (not shown). Herein, a "user agent" refers to software that manages a digital wallet for a particular user, where the digital wallet contains all credentials that have been issued to the user. Within examples, the digital wallet also includes encryption keys that enable communication between the user agent and the gateway computing system 102. Within other examples, the computing device on which the user agent and/or the digital wallet resides is an end-user device such as a smartphone. Additionally or alternatively, within other examples, the computing device on which the user agent and/or the digital wallet resides is a cloud server that allows the user to access the digital wallet using any of multiple computing devices (e.g., the user's smartphone and personal computer).

Within examples, the user agent and the digital wallet are not accessible by any third party without permission from the user. For instance, the user agent is not proprietary software for a company such that the company is able to access and control the digital wallet.

Still further, at least one computing device of the user computing system 104 includes an Internet browser or other software application that enables a user of the smartphone to request access to content of the software application 112 hosted on the server 110.

The issuer 106 is one or more computing devices controlled by an authority that issues credentials to various users for those users to access the software application 112. Within examples, before issuing a credential to a user, the issuer 106 creates a credential schema, or selects an existing credential schema for the credential, and writes that credential schema to the distributed ledger 108.

Within examples, the credential schema is a template that includes data fields selected by the issuer 106, such as first name, last name, address, business unit, team, security level, among many other possibilities. The credential schema can be unique to a particular software application (e.g., software application 112) or can be associated with multiple different software applications. Creating the credential schema creates a transaction that is added to the distributed ledger 108. The credential schema has a credential schema identifier associated therewith, which identifies the transaction. Within examples, the credential schema can be read by any entity with access to the distributed ledger 108.

The issuer 106 then signs a copy of the credential schema with a unique key, which associates an issuer identifier of the issuer 106 (also referred to as a "decentralized identifier") to the credential schema. The signed copy of the credential schema is referred to herein as a "credential definition." The signing of the copy of the credential schema creates another transaction that is added to the distributed ledger 108. The credential definition has a credential definition identifier associated therewith, which identifies this other transaction. The signing of the credential schema enables the distributed ledger 108 to verify the issuer identifier for a given credential and, by looking at the credential schema identifier, determine what kind of credential the given credential is. Further, within examples, a public key of the issuer 106 can be included within the credential definition transaction, which can allow validation of credentials signed by the issuer 106 with the issuer's unique key. Within examples, the credential definition can be read by any entity with access to the distributed ledger 108.

Thus, for a given credential, the credential data stored on the distributed ledger 108 includes a credential schema (and identifier thereof), a credential definition (and identifier thereof), and an issuer identifier.

Having created and signed the credential schema, the issuer 106 can issue credentials to users for those users to access the software application 112 in accordance with a security policy for the software application 112. Within examples, to set up the security policy for the software application 112, the issuer 106 selects the credential schema identifier and the credential definition identifier to associate to the software application 112. The security policy thus indicates what credentials to check for the software application 112.

A particular credential issued to a particular user is stored in that user's digital wallet. In situations where the issuer 106 later revokes a credential issued to a given user, a new transaction is written to the distributed ledger 108, thus updating the distributed ledger 108 to indicate that the credential has been revoked.

In a specific example of credential issuance, a credential schema can be created by a first entity, such as the Federal Aviation Administration (FAA) creating a credential schema for a pilot license credential. A second entity, such as an aircraft manufacturer or commercial airline, can then access and sign the credential schema with its unique key and write that credential definition to the distributed ledger 108. Thus, when the second entity issues a credential to a pilot, that entity will associate the credential with the credential definition. This association supports the ability for a verifier (e.g., the gateway computing system 102, using the distributed ledger 108) to check if the credential present by the user is indeed issued by the second entity, and, by checking the association of the credential with the FAA-created credential schema, can also check to make sure the credential is a pilot license credential.

In another specific example, an aircraft manufacturer can issue credentials to each of a plurality of commercial airlines, and those commercial airlines, with their own respective systems having access to the distributed ledger 108, can then issue credentials to their employees.

The distributed ledger 108 can take various forms, such as a blockchain-based distributed ledger, for instance, and can be implemented on a private or public network.

The server 110 can be any computing device or group of computing devices (e.g., a cloud server) configured to host software, such as the software application 112.

In a specific example, the issuer 106 is the same entity that controls the server 110 such as a corporation that seeks to issue credentials to its employees and/or customers for those employees and/or customers to access the corporation's software application hosted on the server 110. Alternatively, the issuer 106 is different from the entity that controls the server 110.

The one or more processors 114 is/are configured to perform various operations, which will now be described in more detail.

In operation, the gateway computing system 102 receives, from the user computing system 104, a request to access the software application 112, and responsively communicates with the user computing system 104 to obtain, from the user computing system 104, a credential for the software application 112 issued to a user of the user computing system 104. For example, the gateway computing system 102 establishes communication with the user agent and requests the credential from the user agent.

Prior to receiving the request, the gateway computing system 102 might determine the security policy defining the credentials required to access the software application 112. Within examples, the gateway computing system 102 receives the credential schema identifier and the credential definition identifier from the issuer 106 and stores, in memory 116, data correlating the credential schema identifier and the credential definition identifier to the software application 112.

Having obtained the credential, the gateway computing system 102 communicates with the distributed ledger 108 to verify the credential. In particular, the gateway computing system 102 compares the credential to credential data (e.g., credential schemas, credential definitions, issuer identifiers) stored on the distributed ledger 108 to determine whether the credential meets a set of conditions.

Within examples, the gateway computing system 102 engages in a handshake with the distributed ledger 108 in which the gateway computing system 102 reads the distributed ledger 108 to determine whether the credential meets one or more conditions that make up the set of conditions. For example, the gateway computing system 102 reads the distributed ledger 108 to confirm that the credential is associated with a particular credential schema and a particular credential definition, such as the credential schema and credential definition selected for the security policy for the software application 112 and as identified by their respective identifiers.

Additionally or alternatively, the gateway computing system 102 reads the distributed ledger 108 to confirm that the credential has not been revoked by an issuing entity (e.g., issuer 106) for the credential. For example, the gateway computing system 102 can determine whether a transaction revoking the user's credential has been written to the distributed ledger 108 by the issuer 106 identified by the issuer identifier associated with the credential.

Additionally or alternatively, the gateway computing system 102 reads the distributed ledger 108 to confirm that the credential has not been modified, or owned, by a third-party. For example, when the credential is issued to the user, the issuer 106 might have inserted cryptographic keys generated by using a master secret of the user against the credential payload. Upon the user presenting the credential to the gateway computing system 102, the user computing system 104 might also send the master secret to the gateway computing system 102. Using the distributed ledger 108, the gateway computing system 102 can attempt to generate the same cryptographic keys using the received master secret. If the user is not the correct holder, or "owner," of the credential, this verification will fail. Similarly, if another person has modified the credential, this verification would fail.

Additionally or alternatively, the gateway computing system 102 determines that the issuer identifier identifying an issuing entity (e.g., the issuer 106) for the credential is on an approved list of issuers. The gateway computing system 102 can determine the issuer identifier by reading the distributed ledger 108, or the credential itself that is received from the user computing system 104 can include the issuer identifier. The approved list of issuers can be stored locally at or remotely from the gateway computing system 102. This determination can be considered one of the set of the conditions, or can be another, separate determination that is made to facilitate verification of the credential and the subsequent operations performed.

In response to determining that the credential meets the set of conditions, the gateway computing system 102 establishes an authorized session between the user computing system 104 and the server 110 such that communication between the user computing system 104 and the server 110 passes through the gateway computing system 102. Within examples, the issuer identifier being on the approved list of issuers might be an additional requirement for triggering the gateway computing system 102 to establish the authorized session, in line with the discussion above.

Figure 2:
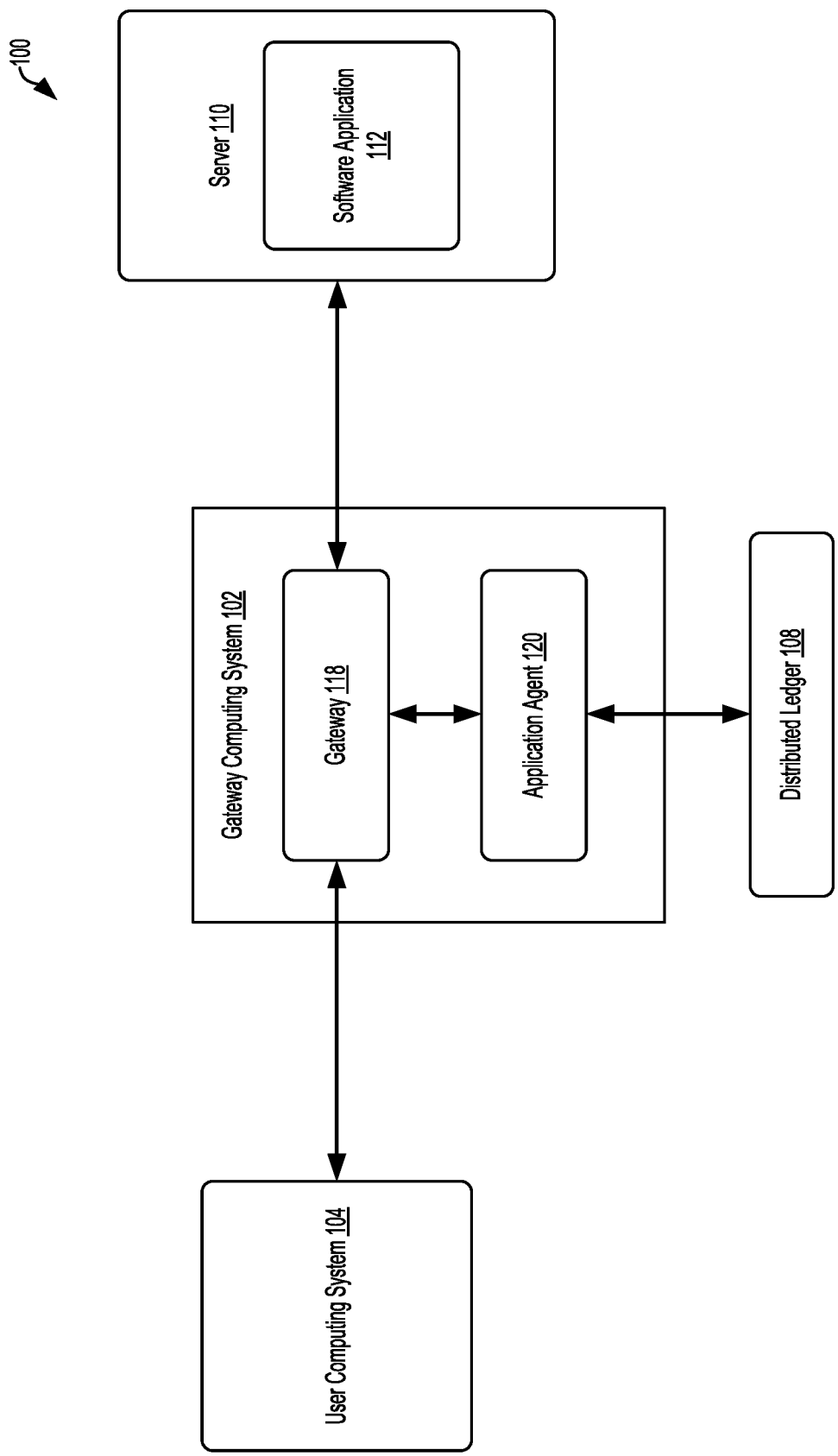
FIG. 2 depicts components of the system of FIG. 1, including components of gateway computing system of FIG. 1, according to an example implementation.

FIG. 2 depicts components of the system 100 of FIG. 1, including components of gateway computing system 102, according to an example implementation. In particular, within example implementations, the gateway computing system 102 includes a gateway 118 and an application agent 120 associated with the software application 112.

Within examples, the gateway 118 and the application agent 120 are separate computing devices, each with at least one respective processor and each including respective memory or otherwise having access to the same memory (e.g., a shared database), or are separate pieces of software running on respective computing devices.

In operation, the act of receiving the request from the user computing system 104 is performed by the gateway 118, upon which the gateway 118 forwards the request to the application agent 120. The application agent 120 then establishes communication with the user computing system 104 via the gateway 118 and requests the credential from the user computing system 104, receiving the credential in response to the requesting.

Next, the application agent 120 communicates with the distributed ledger 108 to determine whether the credential meets the set of conditions. For example, the application agent 120 performs the operations described above, including reading the distributed ledger 108 to determine whether the credential meets the above-described set of conditions. Additionally, in some implementations, the application agent 120 refers to a stored list of approved issuers to confirm that the issuer identifier associated with the credential is on that list of approved issuers.

In response to determining that the credential meets the set of conditions, the application agent 120 is configured to transmit an authentication message to the gateway 118 to inform the gateway 118 that the credentials are valid. Upon receipt of the authentication message, the gateway 118 responsively establishes the authorized session between the user computing system 104 and the server 110.

Further, once the user is granted access, the gateway 118 can generate a token (e.g., a JSON web token) and uses that token to establish a web session with the software application 112 behind it. Traffic can then be passed to and from the server 110 via the gateway 118.

Within examples, based on the trust level of the credential or collection of credentials presented to the gateway computing system 102, the gateway computing system 102 either grants or denies access to the software application 112 (or other protected resource, in other scenarios), or routes the user to a trust elevation service.

Figure 3:
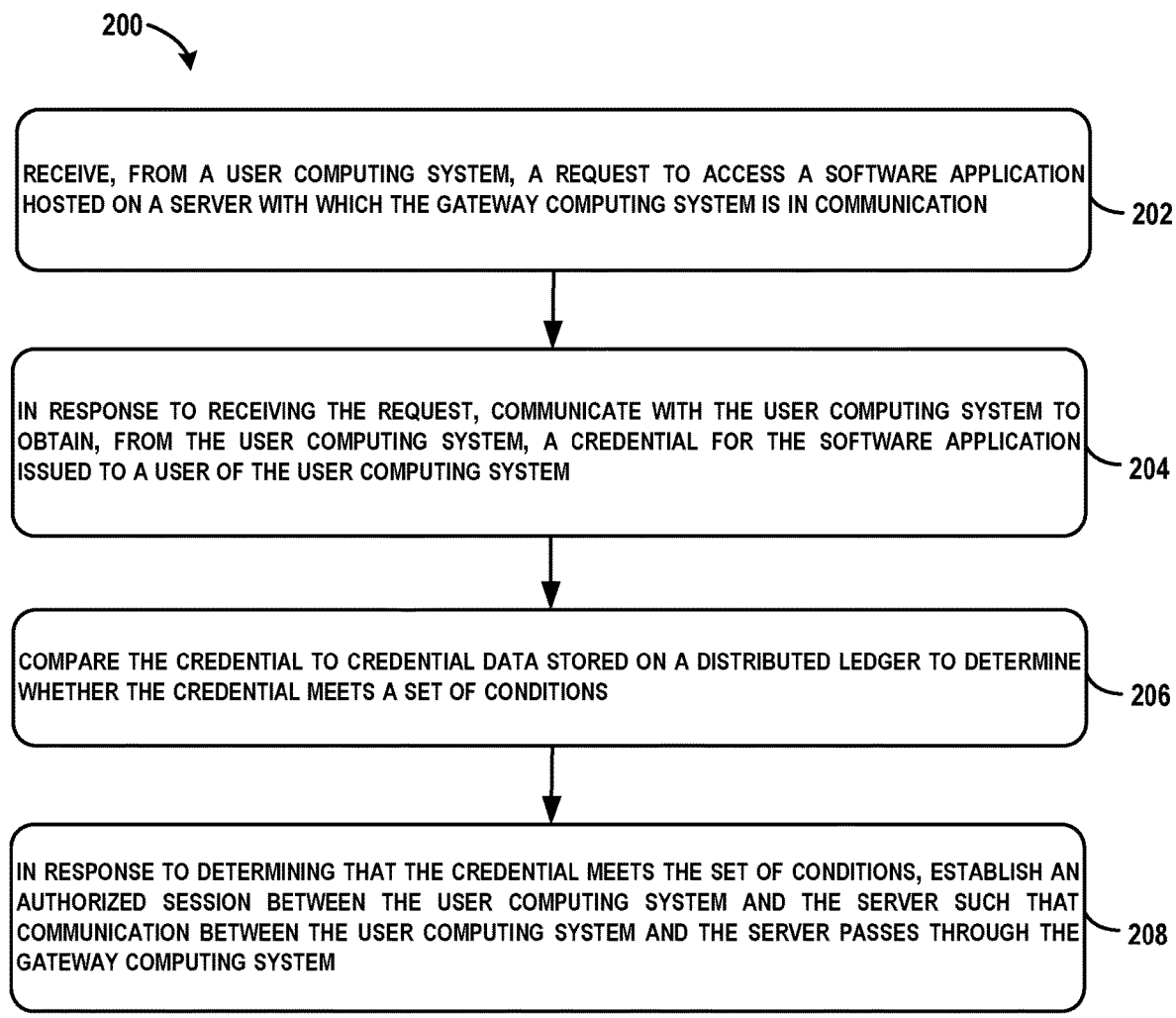
FIG. 3 shows a flowchart of a method, according to an example implementation.

FIG. 3 shows a flowchart of an example of a method 200. Method 200 could be performed by the gateway computing system 102 of FIG. 1 and FIG. 2, or components thereof, such as the gateway 118 and the application agent 120. Method 200 may include one or more operations, functions, or actions as illustrated by one or more of blocks 202-208.

At block 202, the method 200 includes receiving, from a user computing system, a request to access a software application hosted on a server with which the gateway computing system is in communication.

At block 204, the method 200 includes in response to receiving the request, communicating with the user computing system to obtain, from the user computing system, a credential for the software application issued to a user of the user computing system.

At block 206, the method 200 includes comparing the credential to credential data stored on a distributed ledger to determine whether the credential meets a set of conditions.

At block 208, the method 200 includes in response to determining that the credential meets the set of conditions, establishing an authorized session between the user computing system and the server such that communication between the user computing system and the server passes through the gateway computing system.

In some embodiments, the method 200 also includes determining that an issuer identifier identifying an issuing entity for the credential is on an approved list of issuers, where establishing the authorized session is performed further in response to determining that the issuer identifier is on the approved list of issuers.

In some embodiments, the comparing of block 206 includes comparing the credential to credential data stored on a distributed ledger to determine whether the credential meets a set of conditions, where the set of conditions includes one or more of: a condition that the credential is associated with a particular credential schema and a particular credential definition, a condition that the credential has not been revoked by an issuing entity for the credential, or a condition that the credential has not been modified, or owned, by a third-party.

In some embodiments, the credential data includes a particular credential schema comprising a set of data fields selected by an issuing entity for the credential, a credential schema identifier for the particular credential schema, a particular credential definition comprising a copy of the particular credential schema associated with an issuer identifier of the issuing entity and signed using a unique key of the issuing entity, and a credential definition identifier for the particular credential definition.

In some embodiments, the distributed ledger includes a blockchain-based distributed ledger, and the particular credential schema and the particular credential definition are two separate transactions on the blockchain-based distributed ledger, identified by the credential schema identifier and the credential definition identifier, respectively.

In some embodiments, the method 200 also includes determining a security policy defining credentials required to access the software application, where the determining includes storing, in memory, data correlating the credential schema identifier and the credential definition identifier to the software application.

In some embodiments, the communicating of block 204 includes communicating with the user computing system over a peer-to-peer encrypted channel between the gateway computing system and the user computing system.

In some embodiments, the user computing system is configured to store the credential in a digital wallet that is not accessible by any third party without permission from the user.

In some embodiments, the gateway computing system includes a gateway, as well as an application agent associated with the software application. In such embodiments, the receiving of block 202 includes receiving the request comprises the gateway receiving the request and forwarding the request to the application agent, the communicating of block 204 includes the application agent establishing communication with the user computing system, requesting the credential from the user computing system, and receiving the credential in response to the requesting, and the comparing of block 206 includes the application agent communicating with the distributed ledger to determine whether the credential meets the set of conditions. In response to determining that the credential meets the set of conditions, the application agent is configured to transmit an authentication message to the gateway to inform the gateway that the credentials are valid. Further, the establishing of block 208 includes the gateway establishing the authorized session between the user computing system and the server in response to receiving the authentication message from the application agent.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method performed by one or more processors of a gateway computing system, the method comprising:
   receiving, from a user computing system, a request to access a software application hosted on a server device with which the gateway computing system is in communication;
   in response to receiving the request, communicating with the user computing system to obtain, from the user computing system, a credential for the software application issued to a user of the user computing system;
   comparing the credential to credential data stored on a distributed ledger to determine whether the credential meets a set of conditions,
      wherein the credential data comprises a first identifier associated with a credential schema that is signed with a unique digital key, a second identifier associated with a credential definition, and an issuer identifier,
         wherein the credential schema is a template that includes selected data fields associated with an authorization process,
      wherein the credential definition and a transaction is generated based on the credential schema being signed with the unique digital key and the transaction is added to the distributed ledger,
      wherein the signing of the credential schema enables the distributed ledger to verify a particular issuer identifier for a given credential, and
      wherein the first identifier and the second identifier are selected to set up a security policy for the software application;
   receiving a master secret from the user computing system;
   generating, based on the received master secret, a first cryptographic key;
   comparing the first cryptographic key with a second cryptographic key associated with the credential data; and
   in response to determining that the credential meets the set of conditions and based on the first cryptographic key and the second cryptographic key matching, establishing an authorized communication session between the user computing system and the server device such that communication between the user computing system and the server device passes through the gateway computing system.

2. The method of claim 1, further comprising:
   determining that the issuer identifier is on an approved list of issuers, wherein the issuer identifier identifies an issuing entity for the credential, wherein establishing the authorized communication session is performed further in response to determining that the issuer identifier is on the approved list of issuers.

3. The method of claim 1, wherein the set of conditions comprises one or more of:
a condition that the credential is associated with a particular credential schema and a particular credential definition, a condition that the credential has not been revoked by an issuing entity for the credential, or a condition that the credential has not been modified, or owned, by a third-party.

4. The method of claim 1, wherein the credential data comprises:
a particular credential schema comprising a set of data fields selected by an issuing entity for the credential, a credential schema identifier for the particular credential schema, a particular credential definition comprising a copy of the particular credential schema associated with the particular issuer identifier of the issuing entity and signed using a unique key of the issuing entity, and
a credential definition identifier for the particular credential definition.

5. The method of claim 4, wherein the distributed ledger comprises a blockchain-based distributed ledger, and
wherein the particular credential schema and the particular credential definition are two separate transactions on the blockchain-based distributed ledger, identified by the credential schema identifier and the credential definition identifier, respectively.

6. The method of claim 4, further comprising:
determining a security policy defining credentials required to access the software application, wherein the determining comprises storing, in memory, data correlating the credential schema identifier and the credential definition identifier to the software application.

7. The method of claim 1, wherein communicating with the user computing system to obtain the credential comprises communicating with the user computing system over a peer-to-peer encrypted channel between the gateway computing system and the user computing system.

8. The method of claim 1, wherein the user computing system is configured to store the credential in a digital wallet that is not accessible by any third party without permission from the user.

9. The method of claim 1, wherein the gateway computing system comprises:
a gateway, and
an application agent associated with the software application.

10. The method of claim 9, wherein receiving the request comprises the gateway receiving the request and forwarding the request to the application agent, wherein communicating with the user computing system to obtain the credential comprises the application agent establishing communication with the user computing system, requesting the credential from the user computing system, and receiving the credential in response to the requesting, wherein comparing the credential to the credential data stored on the distributed ledger comprises the application agent communicating with the distributed ledger to determine whether the credential meets the set of conditions, wherein, in response to determining that the credential meets the set of conditions, the application agent is configured to transmit an authentication message to the gateway to inform the gateway that the credentials are valid, and wherein establishing the authorized communication session between the user computing system and the server device comprises the gateway establishing the authorized communication session between the user computing system and the server device in response to receiving the authentication message from the application agent.

11. A gateway computing system comprising:
one or more processors; and
a non-transitory computer readable medium having instructions stored thereon, that when executed by the one or more processors, cause the gateway computing system to perform a set of operations comprising:
receiving, from a user computing system, a request to access a software application hosted on a server device with which the gateway computing system is in communication;
in response to receiving the request, communicating with the user computing system to obtain, from the user computing system, a credential for the software application issued to a user of the user computing system;
comparing the credential to credential data stored on a distributed ledger to determine whether the credential meets a set of conditions,
wherein the credential data comprises a first identifier associated with a credential schema that is signed with a unique digital key, a second identifier associated with a credential definition, and an issuer identifier,
wherein the credential schema is a template that includes selected data fields associated with an authorization process
wherein the credential definition and a transaction is generated based on the credential schema being signed with the unique digital key and the transaction is added to the distributed ledger,
wherein the signing of the credential schema enables the distributed ledger to verify a particular issuer identifier for a given credential, and
wherein the first identifier and the second identifier are selected to set up a security policy for the software application;
receiving a master secret from the user computing system;
generating, based on the received master secret, a first cryptographic key;
comparing the first cryptographic key with a second cryptographic key associated with the credential data; and
in response to determining that the credential meets the set of conditions and based on the first cryptographic key and the second cryptographic key matching, establishing an authorized communication session between the user computing system and the server device such that communication between the user computing system and the server device passes through the gateway computing system.

12. The gateway computing system of claim 11, the set of operations further comprising:
determining that the issuer identifier is on an approved list of issuers, wherein the issuer identifier identifies an issuing entity for the credential, wherein establishing the authorized communication session is performed further in response to determining that the issuer identifier is on the approved list of issuers.

13. The gateway computing system of claim 11, wherein the set of conditions comprises one or more of:
  a condition that the credential is associated with a particular credential schema and a particular credential definition, a condition that the credential has not been revoked by an issuing entity for the credential, or a condition that the credential has not been modified, or owned, by a third-party.

14. The gateway computing system of claim 11, wherein the credential data comprises:
  a particular credential schema comprising a set of data fields selected by an issuing entity for the credential,
  a credential schema identifier for the particular credential schema, a particular credential definition comprising a copy of the particular credential schema associated with the particular issuer identifier of the issuing entity and signed using a unique key of the issuing entity, and
  a credential definition identifier for the particular credential definition.

15. The gateway computing system of claim 14, wherein the distributed ledger comprises a blockchain-based distributed ledger, and
  wherein the particular credential schema and the particular credential definition are two separate transactions on the blockchain-based distributed ledger, identified by the credential schema identifier and the credential definition identifier, respectively.

16. The gateway computing system of claim 14, the set of operations further comprising:
  determining a security policy defining credentials required to access the software application, wherein the determining comprises storing, in memory, data correlating the credential schema identifier and the credential definition identifier to the software application.

17. The gateway computing system of claim 11, wherein the user computing system is configured to store the credential in a digital wallet that is not accessible by any third party without permission from the user.

18. The gateway computing system of claim 11, further comprising:
  a gateway, and
  an application agent associated with the software application, wherein the one or more processors comprise at least one processor of the gateway and at least one processor of the application agent.

19. The gateway computing system of claim 18, wherein receiving the request comprises the gateway receiving the request and forwarding the request to the application agent, wherein communicating with the user computing system to obtain the credential comprises the application agent establishing communication with the user computing system, requesting the credential from the user computing system, and receiving the credential in response to the requesting, wherein comparing the credential to the credential data stored on the distributed ledger comprises the application agent communicating with the distributed ledger to determine whether the credential meets the set of conditions, wherein, in response to determining that the credential meets the set of conditions, the application agent is configured to transmit an authentication message to the gateway to inform the gateway that the credentials are valid, and
  wherein establishing the authorized communication session between the user computing system and the server device comprises the gateway establishing the authorized communication session between the user computing system and the server device in response to receiving the authentication message from the application agent.

20. A non-transitory computer readable medium having stored thereon instructions, that when executed by one or more processors of a gateway computing system, cause the gateway computing system to perform a set of operations comprising:
  receiving, from a user computing system, a request to access a software application hosted on a server device with which the gateway computing system is in communication;
  in response to receiving the request, communicating with the user computing system to obtain, from the user computing system, a credential for the software application issued to a user of the user computing system;
  comparing the credential to credential data stored on a distributed ledger to determine whether the credential meets a set of conditions,
    wherein the credential data comprises a first identifier associated with a credential schema that is signed with a unique digital key, a second identifier associated with a credential definition, and an issuer identifier,
      wherein the credential schema is a template that includes selected data fields associated with an authorization process,
    wherein the credential definition and a transaction is generated based on the credential schema being signed with the unique digital key and the transaction is added to the distributed ledger,
    wherein the signing of the credential schema enables the distributed ledger to verify a particular issuer identifier for a given credential, and
    wherein the first identifier and the second identifier are selected to set up a security policy for the software application;
  receiving a master secret from the user computing system;
  generating, based on the received master secret, a first cryptographic key;
  comparing the first cryptographic key with a second cryptographic key associated with the credential data; and
  in response to determining that the credential meets the set of conditions and based on the first cryptographic key and the second cryptographic key matching, establishing an authorized communication session between the user computing system and the server device such that communication between the user computing system and the server device passes through the gateway computing system.

* * * * *